(No Model.)

E. RAKESTRAW.
COFFEE GRADER.

No. 261,041. Patented July 11, 1882.

WITNESSES:
Chas. Niola
C. Sedgwick

INVENTOR:
E. Rakestraw
BY Munn & Co.
ATTORNEYS.

(No Model.) 2 Sheets—Sheet 2.
E. RAKESTRAW.
COFFEE GRADER.
No. 261,041. Patented July 11, 1882.
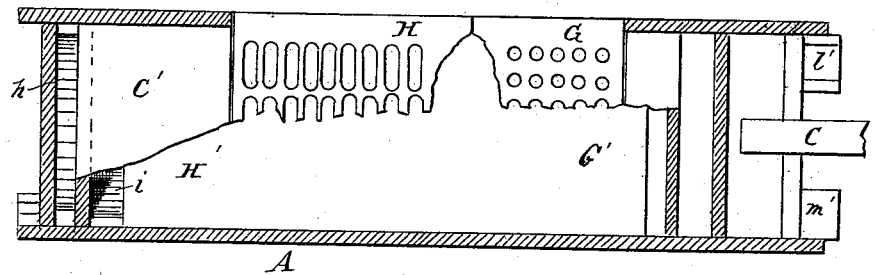
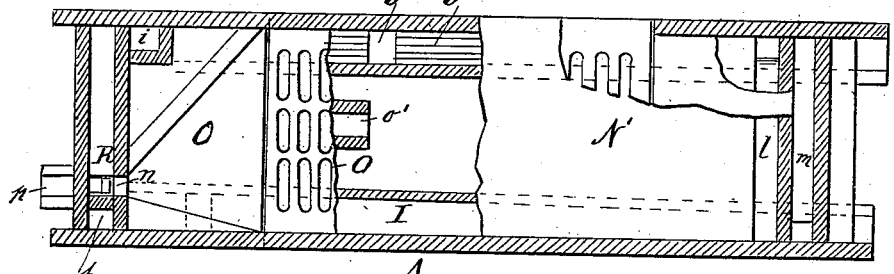
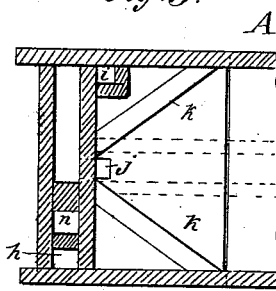
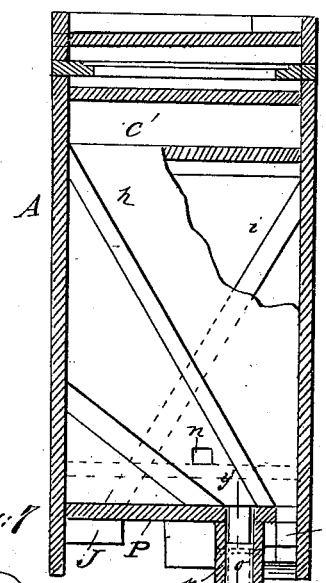
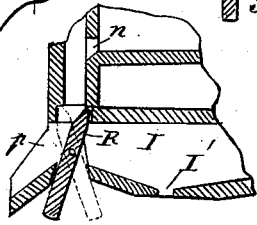
WITNESSES:
Chas. Nida.
C. Sedgwick
INVENTOR:
E. Rakestraw
BY Munn & Co
ATTORNEYS.

UNITED STATES PATENT OFFICE.

ELAM RAKESTRAW, OF CAMBRIDGEPORT, MASSACHUSETTS.

COFFEE-GRADER.

SPECIFICATION forming part of Letters Patent No. 261,041, dated July 11, 1882.

Application filed April 21, 1882. (No model.)

*To all whom it may concern:*

Be it known that I, ELAM RAKESTRAW, of Cambridgeport, in the county of Suffolk and State of Massachusetts, have invented a new and Improved Coffee-Grader, of which the following is a full, clear, and exact description.

The object of my invention is to facilitate separating the flat coffee beans or berries from the round beans or berries.

The invention consists in a machine comprising a reciprocating shoe provided with a series of screens having round apertures, through which round beans can pass, and with a series of screens having slots through which flat beans can pass, each screen being provided with a chute for carrying off the beans that have passed through the screens, which chutes can be so combined by means of pivoted gates in some of the chutes that the round and flat beans can be separated from each other; or the chutes can also be adjusted to separate the round and flat beans and to divide these round and flat beans into portions or grades, according to the size of the beans, all as will be fully described hereinafter, and pointed out in the claims.

Reference is to be had to the accompanying drawings, forming part of this specification, in which similar letters of reference indicate corresponding parts in all the figures.

Figure 1:
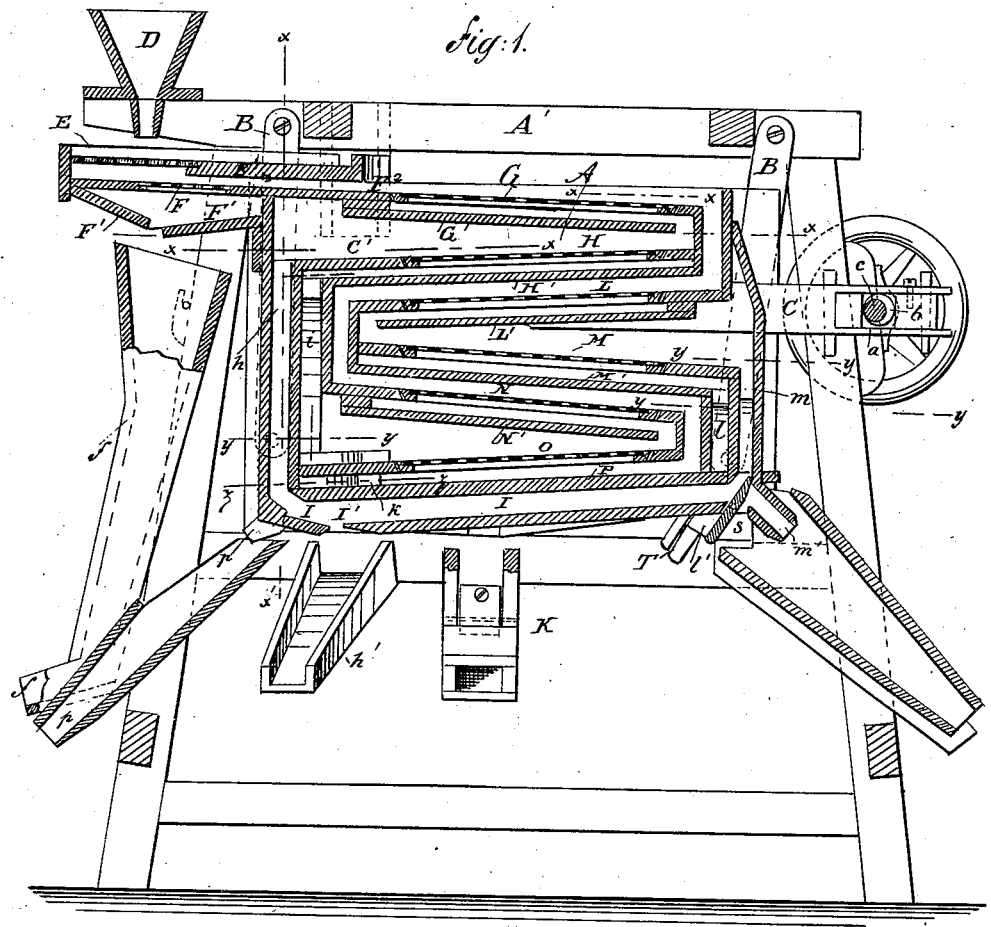
Figure 2:
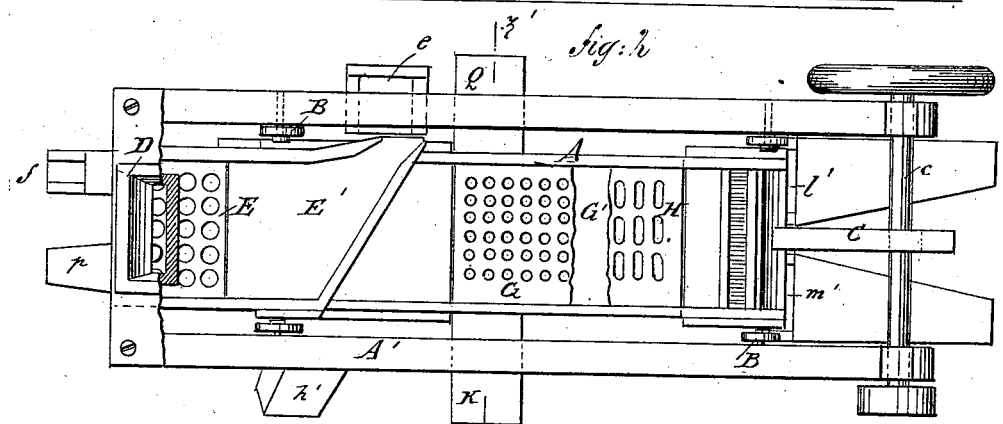

Figure 1 is a longitudinal sectional elevation of my improved coffee-grader. Fig. 2 is a plan view of the same, parts being broken out. Fig. 3 is a sectional plan view of the same on the line $x\ x$, Fig. 1. Fig. 4 is a sectional plan view of the same on the line $y\ y$, Fig. 1. Fig. 5 is a sectional plan view on the line $z\ z$, Fig. 1. Fig. 6 is a cross-sectional elevation of the same on the line $x'\ x'$, Fig. 1. Fig. 7 is a longitudinal sectional elevation on the line $y'\ y'$, Fig. 6. Fig. 8 is a cross-sectional elevation of the same on the line $z'\ z'$, Fig. 2.

The shoe A, containing the screens for cleaning and grading the coffee, is hung in the frame A' by means of arms B, pivoted to the shoe A and to the frame A', so that the shoe can be reciprocated. The shoe A is provided at one end (which will be designated throughout the specification as the "rear end") with a projecting arm, C, and this arm is provided with an aperture, $a$, containing an eccentric, $b$, mounted on a shaft, $c$, journaled in the frame A', and provided with a fly-wheel and belt-pulley. If the shaft $c$ is rotated, the shoe A will be reciprocated or moved forward and backward by the eccentric $b$. The frame A' is provided on its top and at the front end with a hopper, D, into which the coffee to be cleaned and graded is passed, from which hopper D the coffee beans or berries fall upon the screen E at the front of the top of the box A. Stones, sticks of wood, &c., cannot pass through the screen E, and pass over a board, E', and are conducted by suitable passage into a chute, $e$, at the side of the frame A'. The coffee-beans, after passing through the screen E, fall upon a screen, F, having very small apertures, through which screen all the small particles of dirt, broken berries, and like matter pass upon inclined boards F', and from there into a chute, $f$, at the front end of the shoe. The coffee beans or berries pass over the screen F upon the board $F^2$, and thence on the screen G, slightly inclined from the front to the rear of the shoe A. The smallest berries pass through the apertures in the screen G and fall upon a board, G', below the screen G and about parallel with the same, down which board G' these beans slide and fall upon a screen, H, inclined from the rear toward the front of the shoe A, which screen H is provided with transverse slots, as shown in Fig. 3. The round beans cannot pass through these slots, and hence pass over the screen and over a board, C', at the front end of the same, and then drop off the edge of this board and slide down the inclined chute $h$ in the front of the shoe, and from chute $h$ slide into a chute, I, under the shoe A, and pass through an opening, I', in this chute into a chute, $h'$, projecting sidewise from the frame A' below the shoe A. The flat beans pass through the slots of the screen H and fall upon a board, H', below and about parallel with the screen H, and from the lower end of this board H' the flat beans slide down a chute, $i$, at the front end of the shoe, and then slide down by suitable connection into a chute, J, on the bottom of the shoe, and through an opening, J'; in the chute J pass into a chute, Q, projecting sidewise from the frame A' below the shoe A. The beans that have passed over the screen G drop down at the lower end of the same upon a screen, L, below the board H'. The smaller beans fall through the apertures of the screen L upon a board, L', below it, and slide down this board L' and fall upon a screen, M, provided with transverse slots, through which the flat beans fall upon a board, M', below the screen M. The round beans cannot pass through the slots of the screen M, and pass over this screen, and at the end of the same slide down an inclined chute, m, at the rear end of the shoe A, the lower end of this chute m being in communication with a chute, m', projecting from the rear end of the shoe A, this chute m' being at the rear end of the bottom chute I. The flat beans that have passed through the slots of the screen M slide down board M' into a chute, l, the lower end of which is in communication with a chute, l', projecting from the rear of the shoe A, this chute l' being at the rear end of the bottom chute J. The beans that have passed over the screen L fall from the lower end of the same upon a screen, N, over which the larger pass, the small beans passing through the apertures of the screen N upon a board, N', below it, and from the end of this board N' fall upon a screen, O, provided with transverse slots. The flat beans fall through the slots of the screen O upon the bottom P of the shoe A, and by the two strips k are conducted through an opening, j, at the front end of the bottom P into a chute, o', and from there to the chute K, projecting from the side of the frame A' below the shoe A, the inner end of this chute being in communication with the inner end of the chute Q. The round beans which cannot pass through the slots of the screen O pass from the end of this screen through a chute, n, leading to a chute, p, at the front end of the box, this chute p being in communication with the front end of the bottom chute I. The beans that pass over the screen N fall from the end of the same upon the bottom P of the shoe A, and also pass off through the chutes o' K.

A valve or gate, R, is pivoted in the front end of the chute I, and by means of this gate the coffee passing down the chute n can be conducted into the chute p or into the chute I. A valve or gate, S, is pivoted in the rear end of the chute I, and by means of it the coffee passing down the chute m can be conducted into the chute m' or into the chute I. The chute J is provided at its rear end with a pivoted gate, T, by means of which the coffee passing down the chute l can be conducted into the chute l' or into the chute J.

The inclined bottom of the chute K is provided with a valve, U, by means of which a communication can be established between the chutes K and Q, as shown in Fig. 8. The chutes K and Q are provided with gates W' W' at the sides of the bottom of the shoe A, which gates W' are opened to adjust the gate U. The smallest round beans pass through the chute h'. The smallest flat beans pass through the chutes i and J into the chute Q. The second grade of round beans pass through the chutes m and m'. The second grade of flat beans pass through the chutes l and l'. The third grade of round beans pass through the chutes n and p. The third grade of flat beans pass through the chutes j and o' into the chute K. The coffee filled into the hopper D is thus divided into six grades. If the chutes p and m are closed by means of the gates R and S, the second and third grades of round berries will be conducted into the chute I, and all the round berries of the different sizes pass through the aperture I' of the chute I into the chute h'. If the chute l' is closed by the gate T and the gate U in the bottom of the chute K is closed, all the flat beans will be conducted through the aperture J' into the chute K. This machine can thus be used to separate the flat from the round beans, and at the same time it can be used to assort the flat or the round beans according to size.

The slots in the screens H, M, and O are made slightly narrower than the diameter of the apertures in the respective screens G, L, and N, from which they receive the coffee, whereby, as by the reciprocating motion of the shoe A the flat beans are turned up edgewise on reaching the slots, the flat beans fall through the screens G L N and the round beans pass on and over the lower ends of said screens.

Having thus described my invention, what I claim as new, and desire to secure by Letters Patent, is—

1. In a coffee-grader, the combination, with a reciprocating shoe, A, of the screens G, H, L, M, N, and O, the chutes h, i, l, and m in the shoe A, the chutes I, J, and o' on the under side of the same, and the chutes h', K, and Q on the frame of the shoe and below the shoe, substantially as herein shown and described, and for the purpose set forth.

2. In a coffee-grader, the combination, with a reciprocating shoe, A, of the screens G, H, L, M, N, and O, the chutes h, i, l, n, and m in the shoe A, the chutes I and J, the chutes m', l', and p, and the gates R S T, pivoted in the chutes I and J, substantially as herein shown and described, and for the purpose set forth.

3. In a coffee-grader, the combination, with a reciprocating shoe, A, of the screens G, H, L, M, N, and O, the chutes h, i, l, n, and m in the shoe A, the chutes I, J, and o', and the chutes K and Q, and the hinged gate U in the inclined bottom of the chute K, substantially as herein shown and described, and for the purpose set forth.

4. In a coffee-grader, the combination, with a reciprocating shoe, A, of the screens G, H, L, M, N, and O, and the corresponding chutes for carrying off the different grades of coffee, the screens E and F, the chutes e and f, and the hopper D, substantially as herein shown and described, and for the purpose set forth.

ELAM RAKESTRAW.

Witnesses:
JOHN C. MASON,
F. P. TUCKER.